Feb. 25, 1964     D. U. HUNTER     3,122,399
SELF-BALANCING BEARING CONSTRUCTION
Filed April 11, 1962     2 Sheets-Sheet 1

INVENTOR.
DAVID U. HUNTER
BY Clark Ott
ATTORNEYS

Feb. 25, 1964    D. U. HUNTER    3,122,399
SELF-BALANCING BEARING CONSTRUCTION
Filed April 11, 1962    2 Sheets-Sheet 2
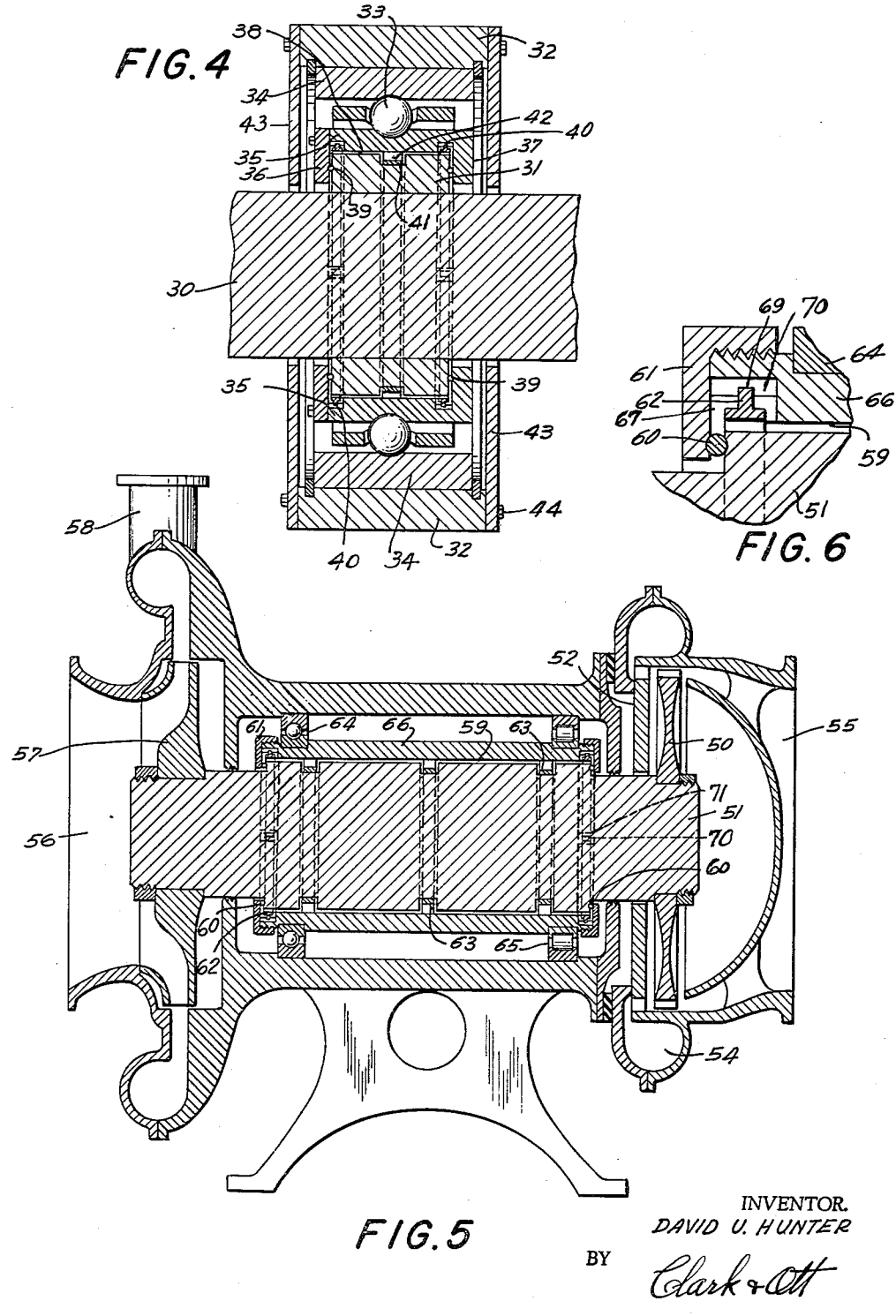
INVENTOR.
DAVID U. HUNTER
BY Clark & Ott
ATTORNEYS

United States Patent Office 3,122,399
Patented Feb. 25, 1964

3,122,399
SELF-BALANCING BEARING CONSTRUCTION
David U. Hunter, 12 Golf Lane, Huntington, N.Y.
Filed Apr. 11, 1962, Ser. No. 186,713
7 Claims. (Cl. 308—8)

This invention relates to a bearing construction for a rotating shaft.

An object of the invention is to provide a bearing construction in which the portion of the shaft supported by the bearing is free to move eccentrically and which automatically moves toward a self-balancing position toward the geometric center of the bearing when rotating beyond the critical speed.

Compressors and turbines should be designed for operating either below first critical speed or between first and second critical speeds. For operation below first critical speed the primary balance and actual shaft stiffness determines the dynamic bearing loads. For operation between first and second critical speeds, the eccentricity between the true mass and the longitudinal center of the bearing times a function of the shaft and bearing stiffness determines the dynamic bearing load. The more flexible the shaft and bearing the less the bearing load. Unfortunately, the maximum eccentricity of the shaft occurs during acceleration through the first critical speed. In the usual turbo-machine, close clearances are required for gas or liquid seals, and at the ends of rotor blades and the like. These clearances have to be made large enough on machines running above the first critical speed so that contact between the stationary and moving parts do not occur. These machines should not be run continuously at reduced speeds which approach the first critical speed. The normal operation is to have the shaft build up speed as rapidly as possible to pass through the first critical speed so as to prevent excessive deflection of the shaft. It will be understood that the best turbine design would be for operation of the shaft well below the first critical speed and with extremely small operating unbalance forces on the rotating assembly. However, this requires a relatively stiff shaft. It is frequently impossible to obtain this result due to the weight of the parts on the shaft and the limitation of shaft diameter because of seal or bearing requirement or length of shaft and the like. It is also difficult to obtain small shaft unbalance because of lack of uniformity of the material thereof and machining tolerances and the thermal and other stress distortions to which the shaft and rotating assembly are subjected to at operating speeds. In this, small distortions are considered, for example, if the center of mass of a shaft rotating at 15,000 r.p.m. is displaced one-thousandth of an inch from the center of rotation, the resulting unbalance force is 6.4 times the weight of the shaft. At 30,000 r.p.m. this force becomes four times as much or 25.6 times the shaft weight.

The present invention provides a shaft construction which eliminates the above difficulties in design. Instead of a solid shaft, a shaft and sleeve construction are arranged for conjoint turning movement within the bearing. Radial clearance of a few thousandths of an inch is provided between the shaft and sleeve with an extremely viscous material imprisoned therebetween and with means biasing the shaft toward concentric relation with the sleeve. This provides a shaft assembly with a natural frequency of a few cycles per minute and with great damping force. Thus, the shaft has floating movement in the viscous material and will seek a self-balancing position when rotating above its critical speed of a few revolutions or cycles per minute.

Another object of the invention is to provide a bearing construction consisting of a shaft and sleeve mounted for rotation within a bearing and with the shaft mounted for rotation with the sleeve and for radial movement with reference thereto into a balancing position within the sleeve.

With the aforegoing and other objects in view, reference is now made to the following specification and accompanying drawings in which the preferred embodiments of the invention are illustrated.

In the drawings:

FIG. 4 is a vertical sectional view of a shaft and bearing construction illustrating another form of the invention.

FIG. 5 is a vertical sectional view through a turbocharger with the shaft, on which the compressor is mounted, journaled in a bearing construction embodying the invention.

FIG. 6 is an enlarged fragmentary sectional view showing a portion of the shaft and sleeve with one of the spiders in position in the recess in one end of the sleeve.

Figure 1:
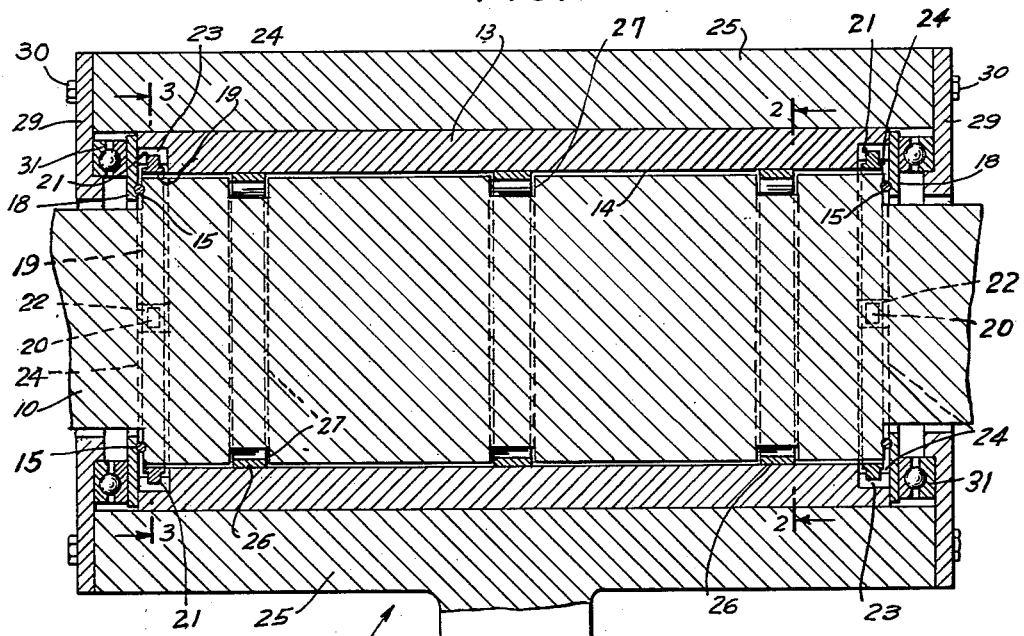
FIG. 1 is a vertical sectional view of a shaft and bearing construction embodying the invention.
Figure 2:
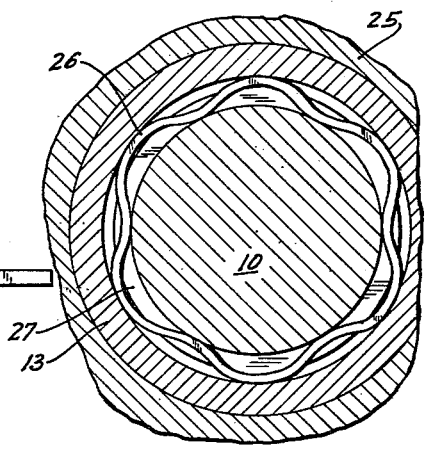
FIG. 2 is a fragmentary cross-sectional view taken approximately on line 2—2 of FIG. 1.
Figure 3:
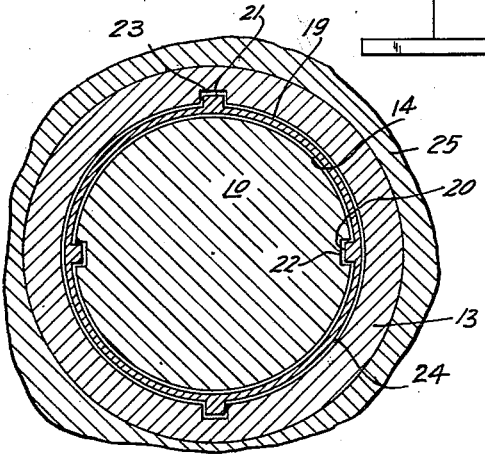
FIG. 3 is a similar view taken approximately on line 3—3 of FIG. 1.

Referring to the drawings and more particularly to the form of the invention shown in FIGS. 1 and 2 of the drawings, the self-balancing bearing construction includes a shaft 10 which is mounted for rotation in a bearing 11 supported in any desired manner such as by a pedestal 12. The shaft 10 is provided with a sleeve 13 extending thereabout in spaced relation therefrom so as to provide an annular space 14 between the inner periphery of the sleeve and the outer face of the shaft on the order of two to five thousandths of an inch radially about the shaft. Annular sealing means such as O-rings 15 are provided for closing off the space 14 at the ends of the sleeve. The O-rings 15 are seated in recesses 16 formed in the inner side faces of annular plates 18 affixed to the ends of the sleeves and with the O-rings bearing against the shoulders formed at the reduced end portions of the shaft. The annular space 14 between the shaft and the sleeve is filled with viscous material such as 100,000 centistoke or heavy silicone fluid, or silicone putty or the like.

Arranged between the shaft and sleeve are spider-like ring members 19 having inner and outer circumferentially spaced lugs 20 and 21 which slidably fit shallow recesses 22 and 23 in the outer periphery of the shaft and the inner periphery of the sleeve respectively for effecting conjoint movement of the shaft and sleeve. The sleeve is formed with annular recesses 24 in the inner periphery thereof which recesses open through the ends of the sleeve and with the recesses 23 extending radially outward from the peripheral faces of said recesses 24 respectively. Thus the shaft and sleeve assembly rotate as a unit with the sleeve journaled for rotation within the bearing 11 and with lubrication between the outer periphery of the sleeve and the inner periphery of the bearing wall 25.

Arranged in bearing engagement against the shaft and sleeve are springs 26 which bias the shaft toward concentric relation with the sleeve when the sleeve is at rest or in rotation. The springs may be of any desired character such as undulating springs or coil springs. As illustrated, the springs are of undulating formation and are located on the shaft in longitudinally spaced relation. The springs are seated in annular grooves 27 in the periphery of the shaft with the bowed portions of the springs biased against the shaft and sleeve. The springs are such that the critical speed of the shaft and sleeve assembly is low, since the critical speed is the relationship between the mass of the shaft and the rate of the spring or, in other words, the pounds per inch of deflection of the springs. When the shaft and sleeve assembly rotates below and up to the critical speed, the shaft will be disposed at its maximum eccentricity with reference to the sleeve. When the shaft rotates beyond its critical speed the center of mass of the portion of the shaft supported by the bearing automatically seeks a self-balancing position toward the geometric center of the outside diameter of the sleeve. The off center or eccentric position of the center of mass of the said portion of the shaft takes place without hindrance by the viscous material in the space 14. In the event that a stationary or non-synchronizing rotating force is applied exteriorly against the bearing and thus against the shaft and sleeve assembly when the shaft is in rotation above critical speed, the viscous fluid acts effectively as a solid to prevent relative radial motion of the shaft within the sleeve.

The bearing 11 is provided with end plates 29 which are secured to the ends of the bearing wall 25 by any desired means such as by bolts 30. The plates are centrally apertured for freely receiving the reduced end portions of the shaft 10 therethrough. Between the end plates 29 and the annular plates 18 are thrust bearings 31 which retain the sleeve 13 centrally within the bearing. Constructed in this manner the shaft 10 has floating movement in the viscous material in the annular recess 14 and will seek a self-balancing position within the sleeve 13 when rotating above its critical speed of a few revolutions or cycles per minute.

The invention may be employed in a bearing in which the sleeve constitutes the inner race of a roller or ball bearing. As illustrated in FIG. 4 of the drawings, the self-balancing bearing construction includes a shaft 30 having an enlarged annular portion or collar 31 which may be integral therewith or formed as an annulus and secured thereto by any desired means and which is located axially of a fixed bearing wall 32 supported in any desired manner. Arranged between the bearing wall 32 and the collar 31 is a ball bearing 33, the outer stationary race 34 of which is affixed to the bearing wall 32, while the inner race 35 extends peripherally about the collar 31 and is rotatable with the shaft 30. The inner race 35 includes annular flanges 36 and 37 at the ends thereof which extend inwardly in narrowly spaced relation from the side faces of the collar 31. The outer periphery of the collar is annularly spaced as at 38 from the inner periphery of the inner race on the order of 2 to 5 thousandths of an inch which space is sealed at its ends by any desired sealing means such as O-rings 39 arranged between the flanges 36 and 37 and the side faces of the collar 31. The space 38 is filled with viscous material as in the previous form of the invention. Spiders 40 similar to the spiders 19 in the previous form of the invention are arranged between the inner race 35 and the collar 31 for effecting conjoint turning movement of the shaft and inner race while permitting of relative radial movement of the shaft with reference thereto. The shaft is biased toward concentric relation with the sleeve by any desired means such as an undulating spring 41 which is seated in an annular groove 42 in the periphery of the collar with the bowed portions of the spring biased against the collar and inner race.

The bearing wall 32 is provided with end plates 43 which are secured thereto in any desired manner such as by bolts 44. The shaft 30 has floating movement in the viscous material in the annular space 38 and will seek a self-balancing position within the inner race 35 when the shaft rotates above its critical speed of a few revolutions or cycles per minute as in the previous form of the invention.

The shafts in the aforesaid forms of the invention are adapted to be operatively connected with any desired motive power means for rotating the same and mounted thereon may be any operable structure for performing a useful function.

The application of the self-seeking bearing construction to an operable unit is shown in FIG. 5 of the drawings illustrating a turbo-charger. The turbo-charger is provided with the conventional construction of turbine wheel 50 mounted on a shaft 51 and arranged adjacent thereto is a fixed disc 52. The shaft is rotated by fluid admitted to the charger through the inlet 54 from any desired means such as an engine exhaust and which fluid is discharged from the charger through the outlet 55. The charger is provided with an air intake 56 receiving air which is compressed by a centrifugal compressor 57 and discharged through the outlet 58 to the engine supply.

The shaft 51 in this construction is provided with a sleeve 66 disposed in surrounding relation therewith to form a shaft and sleeve assembly which as in the previous forms of the invention is provided with viscous material disposed in the space 59 surrounding the shaft and between the same and the sleeve. The space 59 is sealed by any desired sealing means such as O-rings 60 arranged between the shaft and flanged rings 61 secured on the ends of the sleeve. Spiders 62 are provided at the ends of the sleeve for coupling the sleeve and shaft for conjoint turning movement and undulating springs 63 are arranged between the shaft and sleeve which springs bias the shaft toward concentric relation with the sleeve when the shaft is at rest or in motion. In this form of the invention a ball bearing 64 and a roller bearing 65 are arranged between the sleeve and the inner periphery of the housing of the charger with the inner races of the bearings affixed to the sleeve and the outer races thereof fixedly connected with the housing. The shaft and sleeve assembly is thus journaled as a unit in the bearings. The shaft has floating movement in the viscous material in the annular space 59 and will seek a self-balancing position within the sleeve when the shaft rotates above its critical speed.

It will be understood that the annular space 38 between the collar 31 and the inner race 35 in FIG. 4 of the drawings and the annular space 59 between the shaft 51 and the sleeve 66 are preferably on the order of 2 to 5 thousandths of an inch radially about the shafts respectively but the said spacing may be larger than 5 thousandths of an inch. The said spaces have a heavy viscous material whch material acts effectively as a solid to prevent relative radial motion of the shaft within the sleeve in the event that a stationary or non-synchronizing force is applied exteriorly against the bearing and thus against the shaft and sleeve assembly when the shaft is rotating above its critical speed. The annular spaces 14, 38 and 59 in the three forms of the invention illustrated in the drawings are filled with viscous material with the exception of one or two centimeters so as to provide a space for accommodating unequal expansion of the liquid and the metal parts. This space will form a bubble in the liquid which will move into one or more of the annular recesses containing the undulating springs when the shaft is in motion so that the space between the shaft and the surrounding sleeve of each of the forms will be filled with the viscous liquid.

The sleeve 66 as shown in FIGS. 5 and 6 of the drawings is provided with annular recesses 67 in its inner periphery which opens through the ends thereof and in which the spiders 62 are disposed with the projections 69 and 70 extending into notches 71 and 72 in the sleeve and shaft 51 respectively for conjoint movement of the shaft and sleeve.

While the preferred forms of the invention have been shown and described herein, it is to be understood that the invention is not so limited but shall cover and include any and all modifications thereof which fall within the purview of the invention.

What is claimed is:

1. In a self-balancing bearing construction, a bearing, a shaft, a sleeve mounted for rotation within said bearing and disposed in spaced relation about a longitudinal portion of said shaft, means at the ends of said sleeve and said shaft portion sealing the space between said sleeve and shaft portion, said sleeve and shaft having recesses in the confronting faces thereof, means arranged between said sleeve and said shaft portion loosely fitting said recesses connecting said sleeve and shaft for conjoint rotation and permitting of relative radial movement of said shaft with relation to said sleeve, means biasing said shaft towards concentric relation with the sleeve, and said space being filled with a viscous material whereby said shaft has floating movement in said material and will seek a self-balancing position within said sleeve when rotating above its critical speed.

2. In a self-balancing bearing construction, a bearing, a shaft, a sleeve mounted for rotation within said bearing and disposed in spaced relation about a longitudinal portion of said shaft, means at the ends of said sleeve and said shaft portion sealing the space between said sleeve and shaft portion, spider means arranged between said sleeve and said shaft portion connecting said sleeve and shaft for conjoint rotation and permitting of relative radial movement of said shaft with relation to said sleeve, spring means arranged between said shaft and sleeve biasing said shaft toward concentric relation with the sleeve, and said space being filled with a viscous material whereby said shaft has floating movement in said material and will seek a self-balancing position within said sleeve when rotating above its critical speed.

3. In a self-balancing bearing construction, a bearing, a shaft, a sleeve mounted for rotation within said bearing and disposed in spaced peripheral relation about a longitudinal portion of said shaft, means at the ends of said sleeve and said shaft portion sealing the space between said sleeve and shaft portion, spider means arranged between said sleeve and shaft portion and disposed in recesses formed in one of said members at the ends of said sleeve connecting said shaft and sleeve for conjoint rotation and permitting of relative radial movement of said shaft with relation to said sleeve, spring means arranged between said shaft and sleeve and seated in recesses in one of said members biasing said shaft towards concentric relation with the sleeve, and said space being filled with a viscous material whereby said shaft has floating movement in said material and will seek a self-balancing position within said sleeve when rotating above its critical speed.

4. In a self-balancing bearing construction, a bearing, a shaft, a sleeve mounted for rotation within said bearing and disposed in spaced peripheral relation about a longitudinal portion of said shaft, means at the ends of said sleeve and said shaft portion sealing the space between said sleeve and shaft portion, annular members having inwardly and outwardly projecting radially disposed lugs arranged between said sleeve and shaft portion in annular recesses in one of said members at the ends of said shaft portion and with said lugs freely disposed in recesses in said sleeve and shaft to thereby connect said sleeve and shaft for conjoint rotation and permitting of relative radial movement of said shaft with relation to said sleeve, springs of undulating formation disposed between said sleeve and shaft portion in annular recesses arranged in longitudinally spaced relation in one of said members with undulating portions thereof biased against said shaft and sleeve portion, and said space being filled with a viscous material whereby said shaft has floating movement in said material and will seek a self-balancing position within said sleeve when rotating above its critical speed.

5. In a self-balancing bearing construction, a bearing, a shaft having a longitudinally extending portion of enlarged diameter providing shoulders at the ends of said portion, a sleeve mounted for rotation within said bearing and having inwardly directed flanges at the ends thereof, said sleeve being disposed in spaced relation about said longitudinal extending portion of said shaft, means between said flanges and the shoulders of said shaft sealing the space between said sleeve and said shaft portion, spider means arranged between said sleeve and shaft portion and disposed in recesses formed in one of said members at the ends of said sleeve connecting said shaft and sleeve for conjoint rotation and permitting of relative radial movement of said shaft with relation to said sleeve, spring means arranged between said shaft and sleeve and seated in recesses in one of said members biasing said shaft towards concentric relation with the sleeve, and said space being filled with a viscous material whereby said shaft has floating movement in said material and will seek a self-balancing position within said sleeve when rotating above its critical speed.

6. In a self-balancing bearing construction, a bearing, a shaft, a sleeve forming part of said bearing and disposed in spaced relation about a longitudinal portion of said shaft, means at the ends of said sleeve and said shaft portion sealing the space between said sleeve and shaft portion, spider means arranged between said sleeve and shaft portion and disposed in recesses formed in one of said members at the ends of said sleeve connecting said shaft and sleeve for conjoint rotation and permitting of relative radial movement of said shaft with relation to said sleeve, spring means arranged between said shaft and sleeve and seated in recesses in one of said members biasing said shaft towards concentric relation with the sleeve, and said space being filled with a viscous material whereby said shaft has floating movement in said material and will seek a self-balancing position within said sleeve when rotating above its critical speed.

7. In a self-balancing bearing construction, a bearing, a shaft, a sleeve mounted for rotation within said bearing and disposed in spaced relation about a longitudinal portion of said shaft, means at the ends of said sleeve and said shaft portion sealing the space between said sleeve and shaft portion, means extending between said shaft and sleeve connecting said sleeve and shaft for conjoint rotation and permitting of relative radial movement of said shaft with relation to said sleeve, means biasing said shaft towards concentric relation with the sleeve, and said space being filled with a viscous material whereby said shaft has floating movement in said material and will seek a self-balancing position within said sleeve when rotating above its critical speed.

References Cited in the file of this patent
UNITED STATES PATENTS 2,581,656    Harless ------------------ Jan. 8, 1952

FOREIGN PATENTS 578,989    Great Britain ------------ July 18, 1946